United States Patent [19]

Memering

[11] 4,373,051
[45] Feb. 8, 1983

[54] POLYVINYL CHLORIDE CONTAINING VINYL ACETATE-ETHYLENE COPOLYMER AS IMPACT STRENGTH MODIFIER

[75] Inventor: Leroy J. Memering, Cincinnati, Ohio

[73] Assignee: National Distillers & Chemical Corp., New York, N.Y.

[21] Appl. No.: 228,830

[22] Filed: Jan. 27, 1981

[51] Int. Cl.³ .............................................. C08K 3/18
[52] U.S. Cl. ..................................... 524/427; 524/524
[58] Field of Search ..................... 525/222; 260/42.49; 524/427, 524

[56] References Cited

U.S. PATENT DOCUMENTS 3,435,098 3/1969 Watanabe et al. .................. 525/222
3,517,083 6/1970 Salyer .................................. 525/304

FOREIGN PATENT DOCUMENTS 52-3643 12/1977 Japan ................................... 525/222

Primary Examiner—Paul Lieberman
Assistant Examiner—Robert E. L. Sellers
Attorney, Agent, or Firm—Kenneth D. Tremain

[57] ABSTRACT

Polymer blends of improved impact strength are prepared by mixing polyvinyl chloride with an impact strength-increasing amount of an vinyl acetate-ethylene copolymer which has been pre-blended with an ultra-fine particle size inert inorganic filler.

10 Claims, No Drawings

POLYVINYL CHLORIDE CONTAINING VINYL ACETATE-ETHYLENE COPOLYMER AS IMPACT STRENGTH MODIFIER

BACKGROUND OF THE INVENTION

1. Field of the Invention

This invention relates to the field of polymer blends and, more particularly, to blends of polyvinyl chloride, vinyl acetate-ethylene copolymer and inorganic particulate filler.

2. Description of the Prior Art

It is well known that relatively few polymer-polymer blends have useful properties due to their incompatibility. Even useful polymer blends, such as those of nitrile rubber in styrene-acrylonitrile copolymer to increase impact strength, have been greatly improved by substituting rubber styrene-acrylonitrile graft copolymers for the nitrile rubber to provide superior impact resistance. These well known compositions are now generally referred to as the ABS (acrylonitrile-butadiene-styrene) resins.

Techniques other than that of graft polymerization have been employed for introducing compatibility in polymer blends, or alloys. Thus, for example, as described in U.S. Pat. No. 3,906,057, a block copolymer which combines blocks of two homopolymers in a single macromolecule will compatibilize a blend of the homopolymers when added in amounts of about 5–40 weight parts per hundred parts of blend. Similarly, U.S. Pat. No. 3,485,777 describes the compatibilization of polymer blends by the addition of a graft copolymer having molecular segments of solubility characteristics similar to the solubility characteristics of the blended component polymers. Variations of these compatibilization techniques include coupling polymer components in situ with coupling agents as described in U.S. Pat. No. 3,645,939.

These methods of obtaining compatibilization in polymer blends are of limited usefulness since they each depend upon some special additive and extensive working or a chemical reaction to achieve the result desired. Accordingly, attempts have been made in the past to obtain compatibilized polymer blends by merely blending the component polymers using simple known and conventional procedures. A number of polymer alloys containing ethylene-vinyl acetate copolymer or ethylene-vinyl acetate-vinyl alcohol terpolymer and one or more other polymers are known. U.S. Pat. Nos. 3,125,545 and 3,517,083 describe improved impact strength polymer blends based on polyvinyl chloride and ethylene-vinyl acetate copolymer. Not surprisingly, these blends, which are prepared by conventional simultaneous mixing of the resin components, have been found to be unstable. In this connection, U.S. Pat. No. 3,758,661 may be noted for its recognition that copolymers of alpha-olefins such as ethylene-vinyl acetate resin possess poor compatibility with resins such as polyvinyl chloride. U.S. Pat. No. 3,156,666 describes compatible blends of ethylene-vinyl acetate copolymer, an alpha-olefin polymer or copolymer and particulate silica filler. The blending procedure contemplates preparing a pre-blend of either resin with the silica filler. Blends containing rigid polyvinyl chloride resin are neither mentioned nor suggested. U.S. Pat. No. 3,278,645 describes the blending of chlorinated polyethylene pre-blended with pigment, and ethylene-vinyl acetate copolymer. U.S. Pat. No. 3,283,025 describes a polymer blend of polyvinyl chloride containing at least 80 weight percent vinyl chloride and optionally having incorporated therein minor quantities of a copolymerizable monomer such as acrylonitrile, together with 2 to 40 parts by weight of said polyvinyl chloride of an ethylene-vinyl acetate copolymer containing 2 to 65 weight percent vinyl acetate and 3 to 10 parts by weight of said polyvinyl chloride of a chlorinated polyethylene containing 35 weight percent chlorine. No mention is made of the use of a styrene-acrylonitrile copolymer in the aforesaid polymer blends. U.S. Pat. No. 3,322,858 describes multicomponent polymer blends containing vinyl chloride grafted copolymers of up to 50 weight percent ethylene-vinyl acetate copolymer (with the working examples indicating a preference for substantially smaller quantities of ethylene-vinyl acetate copolymer in the graft resin), a chlorinated polyethylene resin and a styrene acrylonitrile copolymer as a processing aid. U.S. Pat. No. 3,549,727 discloses polymer blends containing ethylene-vinyl acetate-vinyl alcohol terpolymer. The use of polyvinyl chloride, chlorinated polyethylene and/or styrene-acrylonitrile copolymer are neither disclosed nor suggested. U.S. Pat. No. 3,644,577 describes polymer blends containing 60 to 95 weight percent polyvinyl chloride and 40 to 5 weight percent of a nitrile copolymer such as styrene-acrylonitrile copolymer. The blends may also contain as an optional ingredient an impact modifier such as an ethylene-vinyl acetate copolymer. The characteristics of the polymers disclosed in this patent are largely those of polyvinyl chloride reflecting the dominant presence of this resin in the blends. U.S. Pat. No. 3,758,661 is illustrative of a two component blend containing a copolymer of an alpha-olefin and a copolymerizable monomer therewith, e.g., ethylene-vinyl acetate copolymer, and a resin having poor compatibility with the olefinic resin such as styrene-acrylonitrile copolymer or polyvinyl chloride. U.S. Pat. No. 3,960,986 describes impact-resistant molding compositions containing 20 to 80 percent polyvinyl chloride, 19.5 to 75 weight percent of a vinyl chloride graft copolymer of ethylene and vinyl acetate and 0.5 to 5.0 weight percent ethylene-vinyl acetate copolymer. The incorporation of nitrile-containing copolymer such as styrene-acrylonitrile copolymer is not mentioned in this patent. U.S. Pat. No. 4,141,936 disclosed compatibilized blends of certain kinds of vinyl acetate-ethylene copolymers and/or ethylene-vinyl acetate-vinyl alcohol terpolymers, styrene-acrylonitrile copolymer, polyvinyl chloride or chlorinated polyethylene, and optionally, small quantities of filler.

SUMMARY OF THE INVENTION

It has now been discovered that the impact strength of blends of polyvinyl chloride and vinyl acetate-ethylene copolymer can be significantly increased by blending the polyvinyl chloride component with the vinyl acetate-ethylene component which has been previously blended with an inert inorganic filler having an average particle size within the range of from about 0.01 microns to about 3.0 microns.

Very surprisingly, the significant increases in impact strength which have been achieved herein are exhibited only when the blends are prepared from polyvinyl chloride and pre-filled vinyl acetate-ethylene copolymer. Similar blends prepared by simultaneously combining the individual components, polyvinyl chloride, vinyl acetate-ethylene copolymer and inorganic particulate, have failed to demonstrate the same levels of impact strength enhancement obtained in accordance with the present invention.

DESCRIPTION OF THE PREFERRED EMBODIMENTS

The vinyl chloride resins which can be employed herein include the graft copolymers, the ungrafted homopolymers and copolymers and post-chlorinated polyvinyl chlorides. As graft and random copolymers, the polyvinyl chloride component of the instant resin blends can contain up to 25 weight percent of one or more other interpolymerized ethylenically unsaturated monomers copolymerizable with vinyl chloride. The preferred polyvinyl chloride resins herein are vinyl chloride homopolymers containing at least about 95 percent polymerized vinyl chloride. The PVC can also contain up to 5 weight percent of a copolymerizable monomer such as vinylidene halide; a vinyl ester, e.g., vinyl acetate; acrylic and alpha-alkyl acrylic acids, e.g., acrylic acid and methacrylic acid; an alkyl ester of such an acid, e.g., methyl acrylate, ethyl acrylate, methyl methacrylate; an amide of such an acid, e.g., acrylamide, methacrylamide; unsaturated nitriles, e.g., acrylonitrile, methacrylonitrile, ethacrylonitrile; a vinyl aromatic, e.g., styrene and alpha-alkyl styrene; dialkyl esters of maleic acid, e.g., dimethyl maleate and the corresponding fumarates; vinyl alkyl ethers and ketones, and various other ethylenically unsaturated compounds copolymerizable with vinyl chloride.

The vinyl acetate-ethylene copolymers which are useful in the preparation of the polymer blends of this invention are copolymers of ethylene and vinyl acetate in a ratio of about 60:40 to about 25:75 and preferably about 65:35 to about 30:70 by weight. The copolymers are a well known type of resin which can be prepared by any of the known and conventional polymerization techniques. The melt flow rate (MFR) of the useful vinyl acetate-ethylene copolymers can be more than about 50 g per 10 minutes as measured under ASTM D-1238 Condition E, but advantageously is less than about 30 g per 10 minutes. The most preferred vinyl acetate-ethylene copolymers will have an MFR less than about 5 g per 10 minutes. Such low MFR's can be readily obtained by crosslinking the copolymers employing known and conventional crosslinking methods. The vinyl acetate-ethylene copolymers herein can also contain one or several monomers copolymerizable with vinyl acetate and ethylene generally not to exceed about 10 percent of the copolymer. Thus, for example the vinyl acetate-ethylene copolymers of this invention can be prepared to include modifying termonomers such as (meth) acrylate ester, e.g., ethyl acrylate, butyl methacrylate, 2-hydroxy ethyl acrylate, and the like; vinyl esters, e.g., vinyl stearate, vinyl versatate, vinyl benzoate, and the like; vinyl esters, e.g., ethyl vinyl ether, hexyl vinyl ether, and the like; and, carbon monoxide.

The inert particulate filler component of the polymer blends herein possess an average particle size which classifies them as being in the ultrafine range, i.e., from about 0.01 to about 3 microns, and preferably from about 0.05 to about 1 micron. The filler can be derived from any of the known and conventional inorganic substances heretofore incorporated into resins such as the metal carbonates, metal oxides, metal hydroxides, silicates, aluminates, glasses, and the like. The metal carbonates are preferred and one such carbonate, Winnifil S (ICI), a precipitated calcium carbonate of about 0.07 microns average particle size, has been found to provide especially good results.

In general, it is desirable to blend only so much of the particle-filled vinyl acetate-ethylene copolymer into the polyvinyl chloride polymer as will provide a desired level of increase in impact strength of the latter. Beyond a certain level, the addition of further quantities of filled vinyl acetate-ethylene copolymer do not bring about proportionate increases in impact strength. Usually, the addition of from about 1 to about 20, and preferably from 2 to about 10 weight parts per hundred of vinyl acetate-ethylene copolymer, exclusive of filler, can be blended with the polyvinyl resin component. As previously indicated, it is critical to obtaining the enhanced impact strength levels herein that the vinyl acetate-ethylene copolymer be pre-blended with the particulate filler prior to being blended with the polyvinyl chloride. The weight ratio of vinyl acetate-ethylene copolymer to filler can vary over fairly wide limits with ratios of from about 1:0.5 to about 1:10, and preferably from about 1:1 to about 1:5, of vinyl acetate-ethylene to filler being entirely suitable in most cases.

Known and conventional molding aids can be incorporated into the polymer blends as desired. Accordingly, the blends can be prepared to include stabilizers in amounts up to about 5, and preferably from about 0.5 to about 3, weight parts per hundred; lubricants in amounts up to about 4, and preferably from about 0.1 to about 3, weight parts per hundred; chelating agents and antioxidants in amounts up to about 2, and preferably from about 0.1 to about 1.5, weight parts per hundred; pigments and dyes in amounts up to about 15, and preferably from about 8 to about 12, weight parts per hundred; and processing aids in amounts up to about 5, and preferably from 1 to about 4, weight parts per hundred.

The final blends as well as the pre-filled vinyl acetate-ethylene copolymer are prepared by heat plastifying and mechanically working the ingredients in admixture with one another in the usual way as by blending the materials on heated rolls, in a Banbury mixer, or in a plastic extruder until a homogeneous and uniform composition is obtained. Temperature in the blending step can vary from about 150° C. to about 210° C. Lower temperatures are ineffective for melt mixing and higher temperatures induce undesirable decomposition and discoloration. It is advantageous to include polyvinyl chloride stabilizers in the blends to permit thorough mixing without discoloration. Pressure can vary from about 0.1 to about 10 atmospheres or more, but atmospheric pressure is usually suitable. In general, compounding the ingredients with one another for periods of from about 0.1 to about 30 minutes, and preferably from about 0.2 to about 15 minutes, provides satisfactory results. Intensive mixing requires less time than low shear mixing but requires greater care to prevent polyvinyl chloride decomposition. Blending should not extend beyond the period sufficient to provide acceptable mixing of the polymer ingredients so as to avoid or minimize any resin decomposition.

The following examples are illustrative of the polymer blends of this invention and the manner in which they are prepared. Izod notched impact strengths, given in ft. lb. per inch of notch, were determined using ASTM D 256 A.

EXAMPLES 1 TO 14

A polyvinyl chloride was dry-blended with additives according to the following formulation:

| Component | Weight Parts per Hundred | Grams |
|---|---|---|
| Geon-103-EP[1] | 100 | 2000 |
| Mark C[2] | 1 | 20 |
| Mark 235[3] | 3 | 60 |
| Acryloid K 120 N[4] | 2 | 40 |
| Titanox 2101[5] | 8 | 160 |
| Calcium stearate | 0.35 | 7 |
| Sunolite 160[6] | 0.15 | 3 |
| | 114.50 | 2290 |

[1] Polyvinyl chloride homopolymer of medium molecular weight and an inherent viscosity of 0.92 measured by ASTM D-1243 (B.F. Goodrich).
[2] Phosphate chelating agent heat stabilizer (Argus Chemical).
[3] Barium/cadmium soap heat stabilizer (Argus Chemical).
[4] Acrylic processing aid (Rohm & Haas).
[5] Titanium dioxide pigment (NL Industries).
[6] Refined petroleum wax (Witco Chemical).

Filled and non-filled vinyl acetate-ethylene (VAE) copolymers blended with the above polyvinyl chloride were provided as follows:

| | VAE Copolymer Sample (weight parts per hundred) | | |
|---|---|---|---|
| Component | A | B | C |
| Vynathene EY-901[7] | 50 | 33.3 | 100 |
| Winnifil S[8] | 50 | 66.7 | — |

[7] A vinyl acetate-ethylene copolymer of about 40 weight percent vinyl acetate and 60 weight percent ethylene (U.S. Industrial Chemicals Co., Division of National Distillers and Chemical Corp.).
[8] Precipitated calcium carbonate of about 0.07 microns average particle size (ICI).

The polyvinyl chloride and the vinyl acetate-ethylene copolymer samples were blended on a Thropp 6"×12" 2-roll mill at a temperature of 385°±5° F. and a roll speed of 20 rpm for the front roll and 30 rpm for the back roll with a total milling time of 10 minutes. The blended resins were then formed into 6"×6"×0.125" plaques and tested for Izod notched impact strength.

The composition of the blends and the result of the impact strength tests are set forth in the following table.

As these data show, Izod notched impact strengths came up to, or exceeded the impact strength of polyvinyl chloride blends to which substantially greater amounts of unfilled vinyl acetate-ethylene copolymer were added. It may be noted that a polyvinyl chloride sample prepared with a pre-blend of a 2:1 weight ratio of filler to vinyl acetate-ethylene copolymer (Example 9) significantly outperformed a polyvinyl chloride sample prepared with separately incorporated filler and copolymer in the same weight ratio (Sample 14). Thus, in accordance with the present invention, it is possible to obtain a given level of impact strength increase employing a smaller quantity of vinyl acetate-ethylene copolymer.

What is claimed is:

1. A blend of (a) polyvinyl chloride and (b) a vinyl acetate-ethylene copolymer which has been pre-blended with an inert inorganic filler having an average particle size within the range of from about 0.01 microns to about 3 microns, in an amount such that said blend contains from about 1 to about 10 parts by weight of vinyl acetate-ethylene copolymer per 100 parts by weight of polyvinyl chloride and the weight ratio of said vinyl acetate-ethylene copolymer to filler is from about 1:0.5 to about 1:10, said vinyl acetate-ethylene copolymer having a ratio of from about 60:40 to about 25:75 of ethylene to vinyl acetate, whereby said blend has significantly increased impact strength.

2. The blend of claim 1 wherein the filler has an average particle size within the range of from about 0.05 microns to about 1 micron.

3. The blend of claim 1 having a weight ratio of vinyl acetate-ethylene to filler of from about 1:1 to 1:5.

4. The blend of claim 1 wherein the filler is a metal carbonate.

5. The blend of claim 1 wherein the filler is precipitated calcium carbonate.

6. The process for increasing the impact strength of polyvinyl chloride which comprises blending the polyvinyl chloride with a vinyl acetate-ethylene copolymer which has been pre-blended with an inert particulate filler having an average particle size within the range of from about 0.01 microns to about 3 microns in an amount such that said blend contains from about 1 to about 10 parts by weight of vinyl acetate-ethylene copolymer per 100 parts by weight of polyvinyl chloride and the weight ratio of said vinyl acetate-ethylene copolymer to filler is from about 1:0.5 to about 1:10, said vinyl acetate-ethylene copolymer having a ratio of from about 60:40 to about 25:75 of ethylene to vinyl acetate.

7. The process of claim 6 wherein the filler has an average particle size within the range of from about 0.05 microns to about 1 micron.

8. The blend of claim 6 having a weight ratio of vinyl acetate-ethylene to filler of from about 1:1 to 1:5.

9. The blend of claim 6 wherein the filler is a metal carbonate.

10. The blend of claim 6 wherein the filler is precipitated calcium carbonate.

| Example | Polyvinyl Chloride Dry Blend phr | Separately Blended Winnifil S Filler phr | VAE Copolymer Sample phr A | VAE Copolymer Sample phr B | VAE Copolymer Sample phr C | Vynathene EY-901 Content in VAE Copolymer Sample (weight parts per hundred) | Izod Notched Impact Strength (ambient temp.) |
|---|---|---|---|---|---|---|---|
| 1 | 114.5 | — | — | — | — | 0 | 0.8 |
| 2 | 114.5 | — | — | — | 6 | 6 | 17.1 |
| 3 | 114.5 | — | — | 6 | — | 2 | 1.9 |
| 4 | 114.5 | — | — | 8 | — | 2.7 | 3.1 |
| 5 | 114.5 | — | — | 10 | — | 3.3 | 7.1 |
| 6 | 114.5 | — | — | 12 | — | 4 | 9.7 |
| 8 | 114.5 | — | 8 | — | — | 4 | 14.1 |
| 9 | 114.5 | — | — | 12 | — | 4 | 12.4 |
| 10 | 114.5 | 4 | — | — | — | 0 | 1.5 |
| 11 | 114.5 | 8 | — | — | — | 0 | 2.4 |
| 12 | 114.5 | — | — | — | 4 | 4 | 4.2 |
| 13 | 114.5 | — | — | — | 6 | 6 | 15.1 |
| 14 | 114.5 | 8 | — | — | 4 | 4 | 4.7 |